United States Patent
Tani et al.

(10) Patent No.: US 9,738,172 B2
(45) Date of Patent: Aug. 22, 2017

(54) POWER GENERATION DEVICE FOR VEHICLE AND POWER GENERATION CONTROL METHOD

(75) Inventors: Hideaki Tani, Chiyoda-ku (JP); Toshiaki Date, Chiyoda-ku (JP); Satoshi Wachi, Chiyoda-ku (JP); Takeru Okabe, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 478 days.

(21) Appl. No.: 14/388,054

(22) PCT Filed: Jun. 14, 2012

(86) PCT No.: PCT/JP2012/065239
§ 371 (c)(1),
(2), (4) Date: Sep. 25, 2014

(87) PCT Pub. No.: WO2013/186895
PCT Pub. Date: Dec. 19, 2013

(65) Prior Publication Data
US 2015/0048802 A1  Feb. 19, 2015

(51) Int. Cl.
*H02J 7/00* (2006.01)
*H02J 7/04* (2006.01)
(Continued)

(52) U.S. Cl.
CPC ....... *B60L 11/1861* (2013.01); *B60L 11/1857* (2013.01); *B60L 11/1862* (2013.01);
(Continued)

(58) Field of Classification Search
CPC .. B60L 11/1861; B60L 11/1862; B60L 15/20; B60W 10/06; B60W 30/18018; F02N 11/0814–11/0844
(Continued)

(56) References Cited

U.S. PATENT DOCUMENTS

2010/0217484 A1* 8/2010 Mizuno ............... F02N 11/0818
701/36

FOREIGN PATENT DOCUMENTS

| CN | 201151342 Y | 11/2008 |
| CN | 101734138 A | 6/2010 |

(Continued)

OTHER PUBLICATIONS

Communication dated Jul. 6, 2016 from the State Intellectual Property Office of the P.R.C. in counterpart Application No. 201280073893.1.
(Continued)

*Primary Examiner* — Richard Isla Rodas
*Assistant Examiner* — David V Henze-Gongola
(74) *Attorney, Agent, or Firm* — Sughrue Mion, PLLC; Richard C. Turner

(57) ABSTRACT

Provided are a power generation control method for a vehicle configured to perform idling stop at a predetermined vehicle speed or less by a stop/start system, the vehicle including: a power generator configured to be driven by an internal combustion engine to generate power; and a battery to be charged by the power generated by the power generator, the power being generated in the vehicle under control so as to reduce an amount of fuel to be consumed by the internal combustion engine for power generation, the power generation control method including: detecting a charged and discharged state of the battery; and controlling the internal combustion engine to interrupt power generation involving fuel consumption when a charged state of the battery has recovered to a charged state before the idling stop through charging after the idling stop in accordance with the detected charged and discharged state.

19 Claims, 5 Drawing Sheets

(51) Int. Cl.

| | | |
|---|---|---|
| *H02J 7/16* | (2006.01) | |
| *B60L 11/18* | (2006.01) | |
| *B60W 10/06* | (2006.01) | |
| *B60W 30/18* | (2012.01) | |
| *F02N 11/08* | (2006.01) | |
| *B60L 15/20* | (2006.01) | |
| *H02J 7/14* | (2006.01) | |

(52) U.S. Cl.
CPC ............ *B60L 15/20* (2013.01); *B60W 10/06* (2013.01); *B60W 30/18018* (2013.01); *F02N 11/0814* (2013.01); *B60L 2240/12* (2013.01); *B60L 2240/423* (2013.01); *B60L 2240/443* (2013.01); *B60L 2240/547* (2013.01); *B60L 2240/549* (2013.01); *B60L 2250/26* (2013.01); *B60L 2260/26* (2013.01); *B60W 2710/065* (2013.01); *B60W 2710/244* (2013.01); *F02N 2200/061* (2013.01); *F02N 2200/062* (2013.01); *F02N 2200/0801* (2013.01); *H02J 7/14* (2013.01); *Y02T 10/48* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01)

(58) Field of Classification Search
USPC .................................... 320/109, 134, 149
See application file for complete search history.

(56) References Cited

FOREIGN PATENT DOCUMENTS

| JP | 2001-268708 A | 9/2001 | |
|---|---|---|---|
| JP | 2007-049779 A | 2/2007 | |
| JP | 4158615 B2 | 10/2008 | |
| JP | 2011-149345 A | 8/2011 | |
| JP | 2012-046120 A | 3/2012 | |
| WO | WO 0170533 A2 * | 9/2001 | ............... B60K 6/28 |

OTHER PUBLICATIONS

International Search Report for PCT/JP2012/065239 dated Sep. 11, 2012.
Written Opinion for PCT/JP2012/065239 dated Sep. 11, 2012.

* cited by examiner

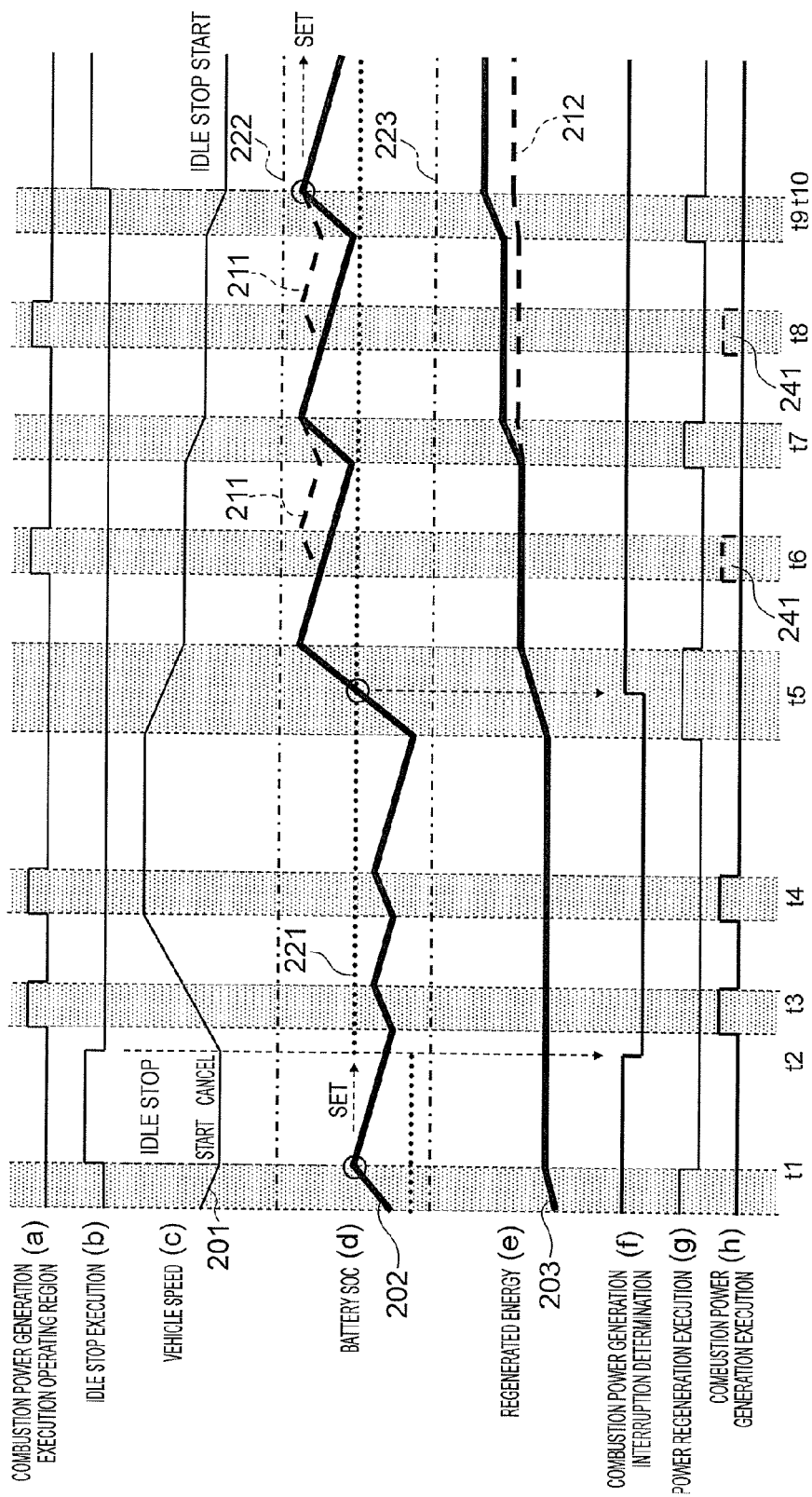

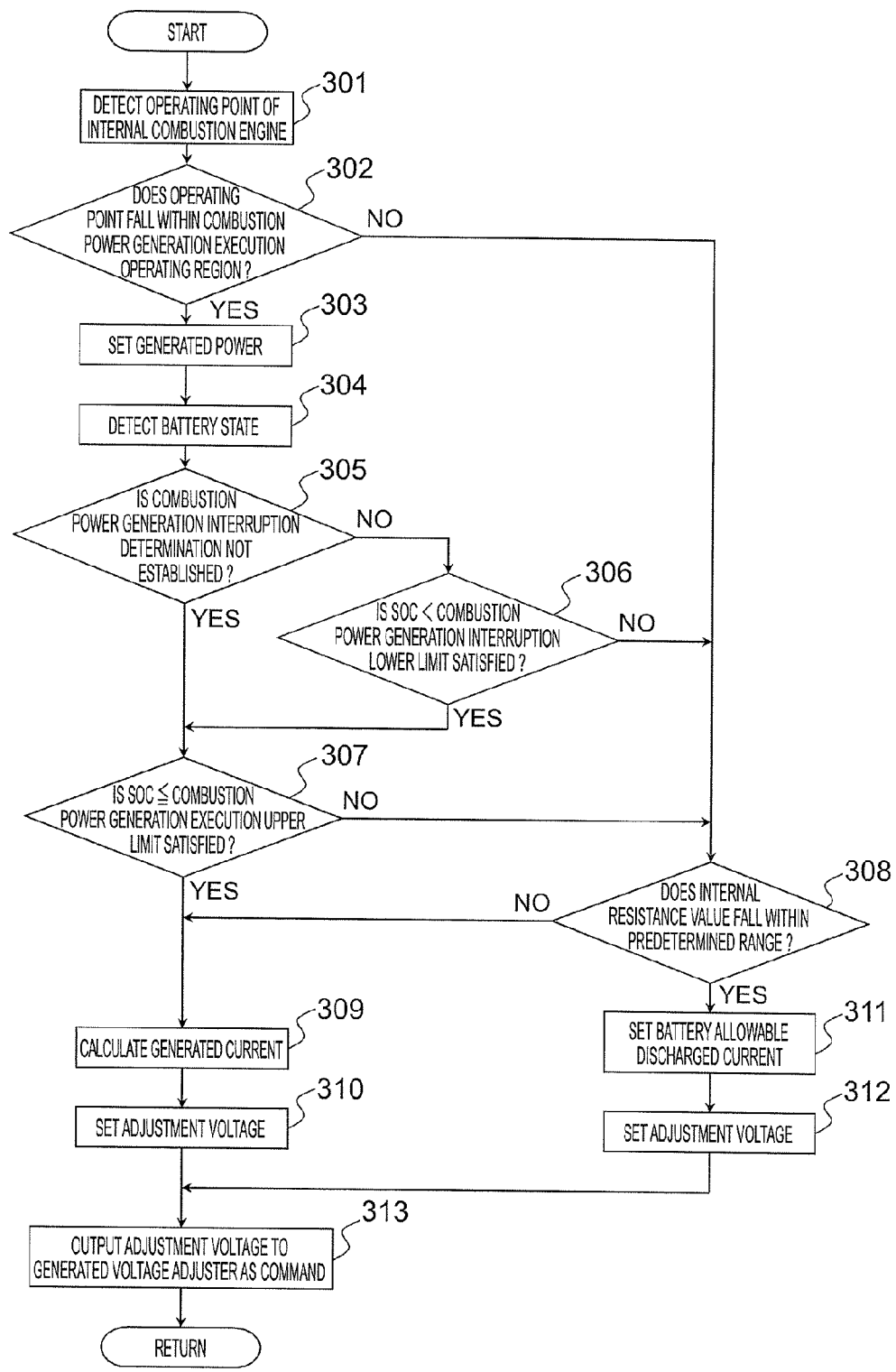

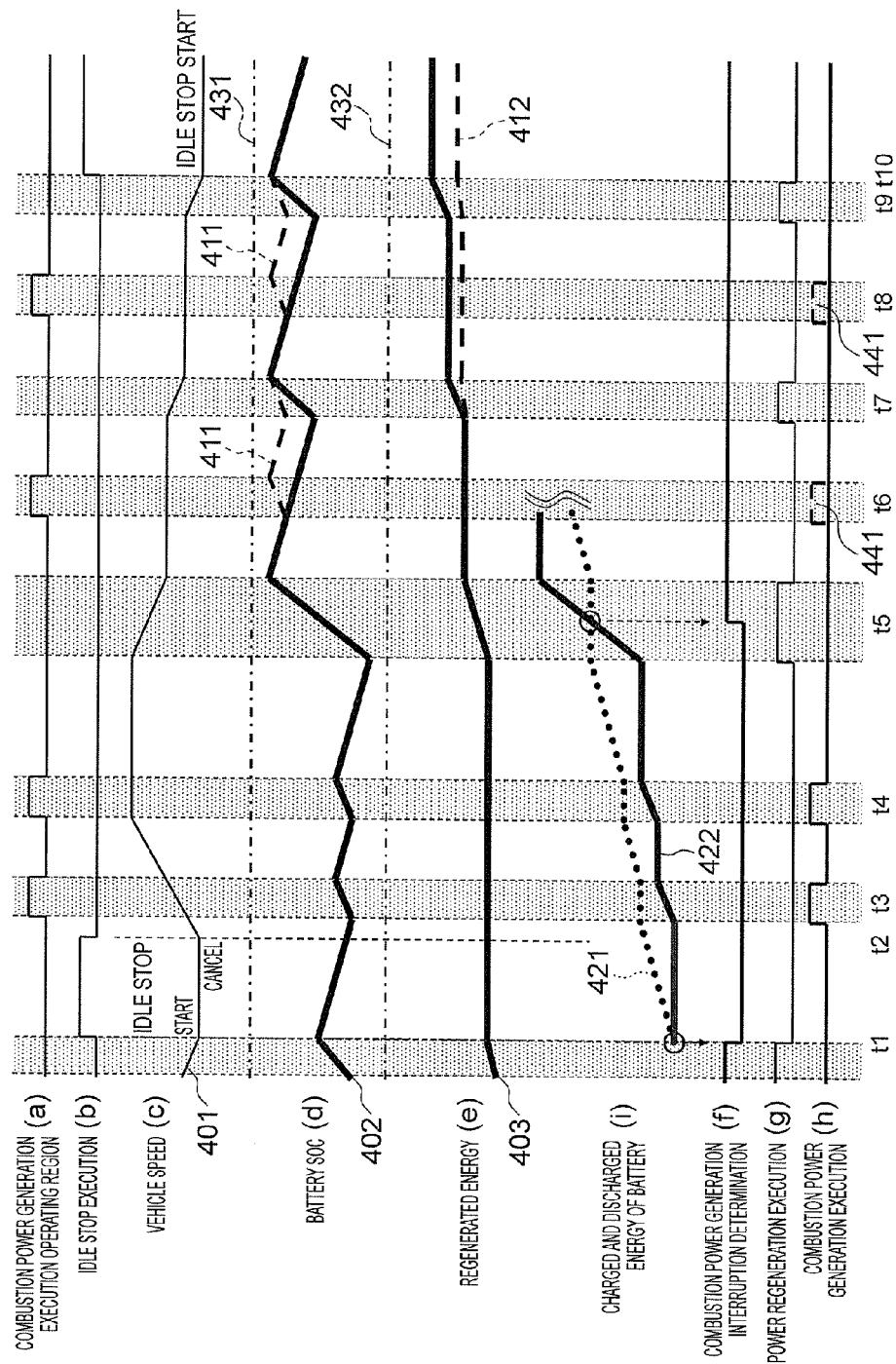

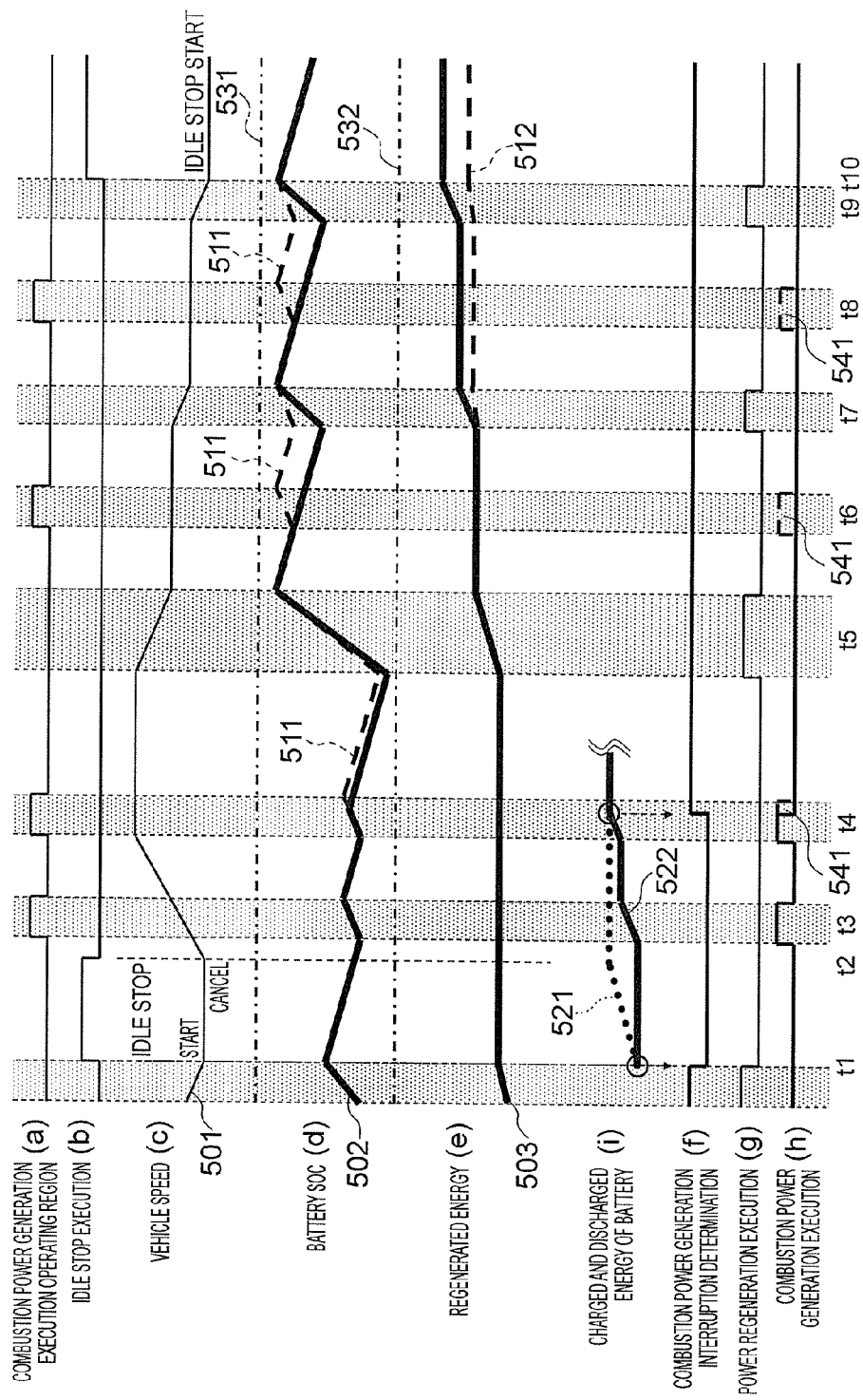

POWER GENERATION DEVICE FOR VEHICLE AND POWER GENERATION CONTROL METHOD

CROSS REFERENCE TO RELATED APPLICATIONS

This application is a National Stage of International Application No. PCT/JP2012/065239 filed Jun. 14, 2012, the contents of all of which are incorporated herein by reference in their entirety.

TECHNICAL FIELD

The present invention relates to a vehicle power generation device and the like, and more particularly, to a reduction in the amount of fuel to be consumed by an internal combustion engine for power generation.

BACKGROUND ART

In the related art, a vehicle has a power generator mounted thereon so as to supply power to various electrical loads and to charge a battery. The power generator is driven by an internal combustion engine to generate power. Therefore, when the internal combustion engine is in operation (excluding when fuel is cut off), fuel is consumed also for the power generation.

In contrast, in recent years, improvement in vehicle fuel efficiency has been desired in view of environmental problems. There have been proposed a method of actively generating power when fuel is cut off in the internal combustion engine, such as when the vehicle is decelerating (hereinafter referred to as "power regeneration"), so as to decrease the chance for the internal combustion engine to perform power generation involving fuel consumption (hereinafter referred to as "combustion power generation"), and a method of setting an operating region of the internal combustion engine as a condition for performing the combustion power generation so as to reduce the amount of fuel to be consumed for the power generation (see Patent Literature 1). In the related art, based on a fuel consumption amount map in which an increased amount of power of the internal combustion engine due to power generation is added, power generation is performed in an operating region of the internal combustion engine in which the amount of fuel consumption is small. In this manner, the amount of fuel to be consumed for power generation is reduced.

CITATION LIST

Patent Literature

[PTL 1] JP 4158615 B

SUMMARY OF INVENTION

Technical Problem

However, in the related art disclosed in Patent Literature 1, no consideration is given of a battery charged state during power generation. In particular, in a case of a lead-acid battery, which is generally and widely used, the charge acceptance tends to reduce as the state of charge (hereinafter referred to as "SOC") of the battery becomes higher. Therefore, when the SOC of the battery becomes higher than necessary due to excessive combustion power generation, the charge acceptance during the power regeneration reduces, to thereby reduce regenerated energy. The reduced regenerated energy is compensated for by increasing the chance of the combustion power generation. As a result, there has been a problem in that the amount of fuel to be consumed for power generation increases.

The present invention has been made to solve the related-art problems described above, and has an object to provide a vehicle power generation device and the like, which take into consideration not only an operating region of an internal combustion engine that performs power generation but also a charged state of a battery, to thereby minimize the reduction in regenerated energy due to combustion power generation and reduce the amount of fuel to be consumed for power generation.

Solution to Problem

According to one embodiment of the present invention, there is provided a power generation device for a vehicle which has a stop/start system for stopping a vehicle engine at a predetermined vehicle speed or less (hereinafter "idling stop"), the power generation device including: a power generator configured to be driven by an internal combustion engine to generate power; a battery to be charged by the power generated by the power generator; and a power generation controller for controlling power generation so as to reduce an amount of fuel to be consumed by the internal combustion engine for the power generation, the power generation controller including: a battery state calculating unit for obtaining a state of the battery including a charged and discharged state; and a power generation control unit for controlling the internal combustion engine to interrupt power generation involving fuel consumption when a charged state of the battery has recovered to a charged state before the idling stop through charging after the idling stop in accordance with the charged and discharged state obtained by the battery state calculating unit.

Advantageous Effects of Invention

According to one embodiment of the present invention, it is possible to provide the vehicle power generation device and the like, which take into consideration not only the operating region of the internal combustion engine that performs power generation but also the charged state of the battery, to thereby minimize the reduction in regenerated energy due to combustion power generation and reduce the amount of fuel to be consumed for power generation.

BRIEF DESCRIPTION OF DRAWINGS

FIG. 2 is a timing chart illustrating a control operation of a power generation controller according to the first embodiment of the present invention.

FIG. 3 is a flowchart illustrating combustion power generation execution processing of the power generation controller according to the first embodiment of the present invention.

FIG. 4 is a timing chart illustrating a control operation of a power generation controller according to a second embodiment of the present invention.

FIG. 5 is a timing chart illustrating a control operation of a power generation controller according to a third embodiment of the present invention.

DESCRIPTION OF EMBODIMENTS

Figure 1:
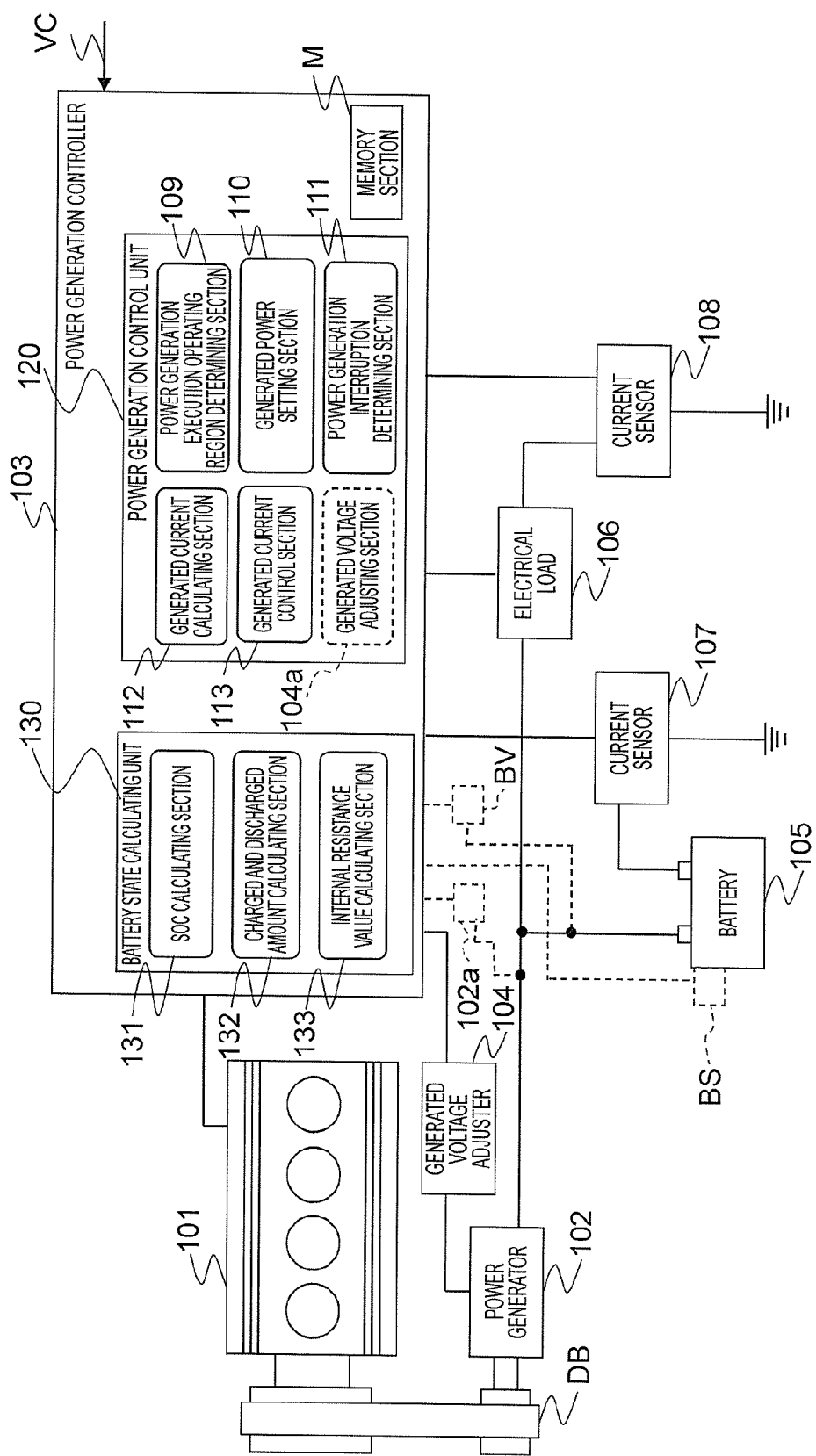
FIG. 1 is a schematic configuration diagram of an internal combustion engine having a vehicle power generation device mounted thereon according to a first embodiment of the present invention.

Referring to the accompanying drawings, a vehicle power generation device and the like according to each embodiment of the present invention are described below. In each embodiment, the same or corresponding parts are denoted by the same reference symbols and overlapping description thereof is omitted.

First Embodiment

FIG. 1 is a schematic configuration diagram of an internal combustion engine having a vehicle power generation device mounted thereon according to a first embodiment of the present invention. In FIG. 1, an internal combustion engine 101 drives a power generator 102 via a drive belt DB, and a power generation controller 103 operates an adjustment voltage of a generated voltage adjuster 104 to control generated power of the power generator 102. The power generation controller 103 is illustrated through extraction of a power generation control part of an internal combustion engine controller (not shown).

The power generation controller 103 includes a computer. A power generation control unit 120 including a power generation execution operating region determining section 109, a generated power setting section 110, a power generation interruption determining section 111, a generated current calculating section 112, a generated current control section 113, and a generated voltage adjusting section 104a, and a battery state calculating unit 130 including an SOC calculating section 131, a charged and discharged amount calculating section 132, and an internal resistance value calculating section 133 for a battery, are parts illustrated as functional blocks to be executed by a program. Further, various pieces of information and data used for the program and processing for executing the respective sections are stored in a memory section M.

Note that, in this embodiment, there is described a mode in which the generated voltage adjuster 104 is provided as a mode having higher control accuracy. However, as an inexpensive system, the power generation controller 103 may include the generated voltage adjusting section 104a therein as an alternative to the generated voltage adjuster 104. In this case, the power generation controller 103 can directly control the generated power of the power generator 102.

Power generated by the power generator 102 is divided into power to be charged into a battery 105 and power to be consumed by an electrical load 106 of the vehicle. Charged and discharged currents of the battery 105 can be detected by a current sensor 107 mounted to a negative terminal of the battery 105. Similarly, a current to be consumed by the electrical load 106 can be detected by a current sensor 108. A generated current of the power generator 102 can be calculated in the generated current calculating section 112 of the power generation controller 103 by adding the electrical load current of the vehicle, which is obtained by the current sensor 108, to the charged current of the battery 105, which is obtained by the current sensor 107.

Note that, in this embodiment, there is described a mode in which the current sensors 107 and 108 are provided. Alternatively, as a mode of directly detecting the generated current of the power generator 102, a current sensor 102a may be provided between the power generator 102 and a positive terminal of the battery 105.

Further, when those current sensors are omitted as an inexpensive system, in a case where the power generator 102 is an alternator, a generated current may be calculated in the generated current calculating section 112 based on the number of revolutions and an FR duty output of the alternator in alternator control and in accordance with a map prestored in the memory section M (for example, map representing a relationship among the number of revolutions, the FR duty output, and the generated current).

Alternatively, when the current sensor 107 is omitted, the generated current calculating section 112 may include a calculation model (constructed of a program, for example) that simulates the characteristics of the battery 105, to thereby estimate the charged current of the battery.

Further, when the current sensor 108 is omitted, the electrical load current of the vehicle may be calculated based on the rated power consumption of the electrical load 106 in operation.

FIG. 2 is a timing chart illustrating a control operation of the power generation controller 103 of FIG. 1 according to the first embodiment of the present invention. Part (a) represents a combustion power generation execution operating region, part (b) represents idling stop execution by the stop/start system, part (c) represents a vehicle speed, part (d) represents a battery SOC, part (e) represents regenerated energy, part (f) represents combustion power generation interruption determination, part (g) represents power regeneration execution, and part (h) represents combustion power generation execution.

In FIG. 2, a solid line 201 represents a vehicle speed, a solid line 202 represents a state of charge (SOC) of the battery, which corresponds to a residual capacity of the battery, a solid line 203 represents regenerated energy, a broken line 211 represents an SOC of the battery in a case where the present invention is not applied (related-art case where the combustion power generation is not interrupted), and a broken line 212 represents regenerated energy in a case where the present invention is not applied (reduction in battery charge acceptance at high SOC). Further, a dotted line 221 represents an SOC at which the combustion power generation is interrupted when the SOC of the battery exceeds this value (combustion power generation interruption SOC), a chain line 222 similarly represents an upper limit SOC at which the combustion power generation is interrupted when the SOC of the battery exceeds this value (combustion power generation execution upper limit SOC), a chain line 223 represents a lower limit SOC at which the combustion power generation is not interrupted when the SOC of the battery falls below this value (combustion power generation interruption lower limit SOC), and a broken line 241 represents excessive power generation that leads to increase in the amount of fuel consumption. Details are described later. In this embodiment, the SOC of the battery may be calculated by integrating the charged and discharged currents of the battery detected by the current sensor 107, or the battery state may be directly detected by providing a battery sensor BS.

Note that, the current sensor 107, the current sensor 102a, the battery sensor BS, a voltage sensor BV to be described later, and the like correspond to a battery state detecting section for detecting the battery state, and the current sensor 107 and the current sensor 102a particularly correspond to a battery current detecting section. Each battery state can be calculated by the battery state calculating unit 130 in the power generation controller 103 based on the detection result of the battery state detecting section. The SOC of the battery can be calculated by the SOC calculating section 131.

Further, vehicle state information to be described later, including a vehicle speed, a restart request such as release of a brake pedal, the number of revolutions of the internal combustion engine, and the torque (alternatively, intake manifold pressure or charging efficiency that substitutes for torque) of the internal combustion engine, is obtained as vehicle state information VC and the like from other controllers in the internal combustion engine controller (not shown).

At time t1, idling stop by the stop/start system is started at a predetermined vehicle speed or less, and at the same time, the SOC of the battery 105 is stored in a memory corresponding to the memory section M of the power generation controller 103. At time t2, the idling stop by the stop/start system is cancelled in response to the restart request such as release of the brake pedal by the driver, and at the same time, the idling stop start SOC stored at the time t1 is set as the combustion power generation interruption SOC 221 (stored into the memory M). Note that, in this embodiment, the idling stop start SOC at the time t1 is directly set as the combustion power generation interruption SOC, but an SOC obtained by adding or subtracting a predetermined amount to or from the idling stop start SOC, or an SOC obtained by adding a predetermined amount to the SOC at the time t2 may be set as the combustion power generation interruption SOC.

After the idling stop by the stop/start system is cancelled at the time t2, the internal combustion engine 101 is restarted, and when it is determined during a period t3 and a period t4 that the operating point of the internal combustion engine 101 falls within the combustion power generation execution operating region, the combustion power generation is performed to increase the SOC of the battery 105. During those periods, the SOC of the battery 105 does not exceed the combustion power generation interruption SOC 221, and hence the combustion power generation interruption determination (battery SOC>combustion power generation interruption SOC) is not established. When the operating point of the internal combustion engine 101 falls within the combustion power generation execution operating region, the combustion power generation is continued.

Subsequently, during a period t5, the vehicle is decelerated and thus the power regeneration is performed. Accordingly, the SOC of the battery 105 exceeds the combustion power generation interruption SOC 221, and the combustion power generation interruption determination is established. When the combustion power generation interruption determination is once established after the idling stop is cancelled, the result of establishment may be held until the next idling stop is executed. Alternatively, the determination may be set to be unestablished when the SOC of the battery 105 falls below the combustion power generation interruption SOC 221 after the first establishment is made. In this manner, until the SOC of the battery 105 exceeds the combustion power generation interruption SOC 221 again, the combustion power generation may be executed while the operating point of the internal combustion engine 101 falls within the combustion power generation execution operating region.

Note that, in this embodiment, there is described a mode in which no power supply is provided other than the battery 105 according to the present invention. However, it is needless to say that, when the battery 105 is charged by another power supply while the idling stop of the stop/start system is executed, and the SOC of the battery 105 exceeds the idling stop start SOC at the time t1, the combustion power generation interruption determination is established at the time t2, and the subsequent combustion power generation is not executed.

During a period t6 and a period t8, when the present invention is not applied, the combustion power generation is not interrupted. The operating point of the internal combustion engine falls within the combustion power generation execution operating region, and hence the combustion power generation is continued. However, during a period t7 and a period t9, the vehicle is decelerated (vehicle speed is reduced) and thus the power regeneration is performed. Accordingly, the SOC of the battery 105 after the power regeneration reaches the same SOC as that in a case where the combustion power generation is continuously interrupted during the period t6 and the period t8 (in the case of the present invention). That is, the amount of fuel consumption increases due to excessive combustion power generation during the period t6 and the period t8. In addition, the SOC of the battery 105 increases more than necessary due to the combustion power generation, and during the period t7 and the period t9, the battery charge acceptance (charging efficiency) during the power regeneration reduces, with the result that the regenerated energy reduces.

At time t10 at which the period t9 ends, similarly to the time t1, the idling stop start SOC is stored in the memory section M of the power generation controller 103. When the idling stop by the stop/start system is subsequently cancelled, the idling stop start SOC stored at the time t10 is set (stored into the memory M) as the combustion power generation interruption SOC 221.

In this embodiment, excluding when the SOC of the battery 105 does not reach the previous idling stop start SOC at the time t1 from the time t2 to the time t10, the combustion power generation interruption SOC 221 tends to increase every time the idling stop of the stop/start system is executed. Therefore, by determining the combustion power generation execution upper limit SOC represented by the chain line 222, the execution of the combustion power generation is interrupted when the SOC of the battery 105 exceeds the upper limit value thereof, to thereby control the SOC of the battery 105 so as not to increase more than necessary due to the combustion power generation.

On the other hand, when the discharged amount of the battery 105 is larger than the charged amount thereof, such as when the idling stop by the stop/start system is repeated in a short period of time, when the chance of power generation during running is insufficient, or when power consumption is large, the combustion power generation interruption SOC 221 tends to decrease every time the idling stop of the stop/start system is executed, and may decrease to fall below the lower use limit of the battery (lower limit SOC causing a fear that the engine cannot be started because of the reduced battery discharge performance or that the degradation progresses). Therefore, by determining the combustion power generation interruption lower limit SOC represented by the chain line 223, the execution of the combustion power generation is not interrupted when the SOC of the battery 105 falls below this lower limit value, to thereby control the SOC of the battery so as not to excessively reduce.

As described above, the SOC of the battery 105 generally transitions while being equal to or lower than the combustion power generation execution upper limit SOC 222 during vehicle running. As the discharged amount of the battery 105 increases, the combustion power generation is performed as well as the power regeneration, and thus the battery can be charged to the previous idling stop start SOC. Note that, it is needless to say that the combustion power generation execution upper limit SOC 222 and the combustion power generation interruption lower limit SOC 223 can be set in accordance with the vehicle running state.

FIG. 3 is a flowchart illustrating combustion power generation execution processing of the power generation controller according to the first embodiment of the present invention, which is executed at a predetermined operation cycle (for example, 100 msec). In Step 301 of FIG. 3, the number of revolutions and torque (alternatively, intake manifold pressure or charging efficiency that substitutes for torque) are detected as the operating point of the internal combustion engine (for example, obtained as the vehicle state information VC from the internal combustion engine controller). Then, the processing proceeds to Step 302. In Step 302, when the operating point of the internal combustion engine falls within a predetermined combustion power generation execution operating region preset and prestored in the memory section M, for example, the processing proceeds to Step 303. In Step 303, a generated current target value is calculated based on a map in accordance with the number of revolutions and the generated voltage of the power generator 102. Then, the generated power is set by multiplying the generated voltage by the generated current target value. Further, the number of revolutions of the power generator 102 is obtained by multiplying the number of revolutions of the internal combustion engine 101 (based on the vehicle state information VC) by a pulley ratio, and the generated voltage is calculated by adding the voltage corresponding to the wiring resistance to the power generator 102 to the battery voltage. The battery voltage is detected by the voltage sensor BV, and the wiring resistance value is prestored in the memory section M. Then, the processing proceeds to Step 304.

In Step 304, the SOC and the internal resistance value are detected as the battery state, and the processing proceeds to Step 305. In this embodiment, the SOC and the internal resistance value of the battery may be calculated based on the charged and discharged currents of the battery and the battery voltage, or the battery state may be directly detected by providing the battery sensor BS.

The above-mentioned internal resistance value of the battery can be calculated by the internal resistance value calculating section 133 of the battery state calculating unit 130.

In Step 305, when the combustion power generation interruption determination is not established, that is, until the discharged amount of the battery 105 after the start of the previous idling stop of the stop/start system is recovered (until the SOC of the battery reaches the previous idling stop start SOC during the period t5 in FIG. 2), the processing proceeds to Step 307. When the combustion power generation interruption determination is established in Step 305, the processing proceeds to Step 306. In Step 306, when the SOC of the battery 105 is lower than the combustion power generation interruption lower limit SOC, there is a fear that the engine cannot be started because of the reduced discharge performance or that the degradation progresses, and hence the battery 105 is required to be charged without interrupting the combustion power generation. Then, the processing proceeds to Step 307. In Step 307, when the SOC of the battery is equal to or lower than the combustion power generation execution upper limit SOC, that is, the SOC of the battery falls within a range in which the reduction of the regenerated energy due to the combustion power generation is small, the execution of the combustion power generation is allowed, and the processing proceeds to Step 309.

The processing proceeds to Step 308 in the following case: when, in Step 302, the operating point of the internal combustion engine is outside the combustion power generation execution operating region; when, in Step 305, the combustion power generation interruption determination is established and, in Step 306, the SOC of the battery is equal to or larger than the combustion power generation interruption lower limit SOC; or when, in Step 307, the SOC of the battery 105 exceeds the combustion power generation execution upper limit SOC. In Step 308, when the internal resistance value of the battery 105 falls within a predetermined range, it is determined that the execution of the combustion power generation is unnecessary, and the processing proceeds to Step 311. When the internal resistance value of the battery 105 is outside the predetermined range in Step 308, there is a fear that the start performance is reduced or that the deterioration processes, and hence the execution of the combustion power generation is allowed in order to charge the battery 105. Then, the processing proceeds to Step 309.

In Step 309, a generated current instantaneous value of the power generator 102 is calculated by adding the electrical load current of the electrical load 106 of the vehicle to the charged current of the battery 105. Then, the processing proceeds to Step 310. In Step 310, a voltage setting value as a command to the generated voltage adjuster 104 is output based on the deviation between the generated current target value calculated based on a map in Step 303 and the generated current instantaneous value calculated in Step 309. Then, the processing proceeds to Step 313.

In Step 311, an allowable discharged current is set so as to prevent the battery 105 from excessively discharging because of no execution of the combustion power generation. Then, the processing proceeds to Step 312. In Step 312, a voltage setting value as a command to the generated voltage adjuster 104 is output based on a deviation between the allowable discharged current and the discharged current (with a sign opposite to the charged current) of the battery 105. Then, the processing proceeds to Step 313. Note that, in this embodiment, there is described a discharge method when there is no abnormality in the usage state and the deterioration degree of the battery 105, and the power generation device of the vehicle is normally operated. However, when any abnormality is detected by other sections, the processing may forcibly proceed to Step 309 in Step 308, or a charged current of the battery 105 may be set in Step 311 so that the battery is forcibly charged in the subsequent step.

In Step 313, an adjustment voltage based on the voltage setting value set in Step 310 or Step 312 is output to the generated voltage adjuster 104 as a command, and the present processing is ended.

Note that, Steps 301 and 302 are executed by the power generation execution operating region determining section 109, Step 303 is executed by the generated power setting section 110, Step 304 is executed by the battery state calculating unit 130, Steps 305 to 307 and 308 are executed by the power generation interruption determining section 111, Step 309 is executed by the generated current calculating section 112, and Steps 310 to 313 are executed by the generated current control section 113.

Through the series of processing described above, when the combustion power generation is executed, power can be generated in a predetermined operating region of the internal combustion engine 101 with predetermined generated power until the discharged amount of the battery 105 after the idling stop of the stop/start system can be recovered. Further, when the combustion power generation is not executed, discharge can be performed within the range of the allowable current of the battery 105.

Note that, in the above, the combustion power generation is interrupted when the SOC of the battery exceeds the combustion power generation interruption SOC, but the combustion power generation may be interrupted when the SOC of the battery reaches (becomes equal to) the combustion power generation interruption SOC.

Further, in this embodiment, only the control processing on the power generator side is described. However, it is needless to say that the vehicle drive torque change due to the combustion power generation may be dealt with by performing the control processing on the internal combustion engine side, in which torque corresponding to the amount of power generation may be compensated for by changing a throttle opening degree or ignition timing. Thus, it is possible to prevent the driver from feeling a sense of discomfort.

In the vehicle power generation device according to the first embodiment of the present invention described above, not only the operating region of the internal combustion engine for power generation but also the SOC of the battery is considered. Thus, the combustion power generation can be interrupted when the SOC of the battery reaches the previous idling stop start SOC. After that, the internal combustion engine does not perform excessive power generation involving fuel consumption. Thus, the reduction of the regenerated energy due to the combustion power generation can be minimized, and the amount of fuel to be consumed for power generation can be reduced.

Second Embodiment

In the vehicle power generation device according to the first embodiment described above, the combustion power generation is interrupted when the SOC of the battery reaches the previous idling stop start SOC. In a vehicle power generation device according to a second embodiment of the present invention, on the other hand, when charged energy of the battery after the idling stop of the stop/start system exceeds discharged energy of the battery in the same period, the combustion power generation is interrupted. That is, the combustion power generation is interrupted at a time point when the amount of power consumption of the vehicle after the idling stop of the stop/start system is recovered by the power regeneration and the combustion power generation.

The schematic configuration diagram of the internal combustion engine having the vehicle power generation device mounted thereon according to the second embodiment is basically the same as FIG. 1. The timing chart illustrating the control operation of the power generation controller according to the second embodiment is basically the same as FIG. 2 in the first embodiment, but details of the control operation for interrupting the combustion power generation differ. The flowchart illustrating the combustion power generation execution processing of the power generation controller according to the second embodiment is basically the same as FIG. 3 in the first embodiment.

In the following, differences from the first embodiment are described with reference to the timing chart illustrating the control operation of the power generation controller according to the second embodiment illustrated in FIG. 4. In FIG. 4, parts (a) to (h) are the same as those in FIG. 2, and part (i) represents charged and discharged energy of the battery. In FIG. 4, a solid line 401 represents a vehicle speed, a solid line 402 represents a state of charge (SOC) of the battery, which corresponds to a residual capacity of the battery, a solid line 403 represents regenerated energy, a broken line 411 represents an SOC of the battery in a case where the present invention is not applied (related-art case where the combustion power generation is not interrupted), and a broken line 412 represents regenerated energy in a case where the present invention is not applied (reduction in battery charge acceptance at high SOC). Further, a chain line 431 represents an upper limit SOC at which the combustion power generation is interrupted when the SOC of the battery exceeds this value (combustion power generation execution upper limit SOC), a chain line 432 represents a lower limit SOC at which the combustion power generation is not interrupted when the SOC of the battery falls below this value (combustion power generation interruption lower limit SOC), and a broken line 441 represents excessive power generation that leads to increase in the amount of fuel consumption.

A dotted line 421 represents discharged energy of the battery 105 after the start of the idling stop of the stop/start system, and a solid line 422 represents charged energy of the battery 105 in the same period. In this embodiment, the discharged energy and the charged energy of the battery 105 are calculated by integrating power distinguished based on the direction of the current (charged and discharged currents) flowing through the negative terminal of the battery 105, which is detected by the current sensor 107. The power is calculated by multiplying the battery current by the battery voltage. The battery current and the battery voltage can be calculated by the charged and discharged amount calculating section 132 of the battery state calculating unit 130.

At time t1, the idling stop by the stop/start system is started at a predetermined vehicle speed or less, and at the same time, the calculation of the discharged energy 421 and the charged energy 422 of the battery 105 is started. At time t2, the idling stop by the stop/start system is cancelled, and at the same time, the internal combustion engine 101 is restarted. When it is determined during a period t3 and a period t4 that the operating point of the internal combustion engine 101 falls within the combustion power generation execution operating region, the combustion power generation is performed to increase the charged energy 422 of the battery 105. On the other hand, after the time t1, the discharged energy 421 of the battery 105 increases in a section in which neither the combustion power generation nor the power regeneration is performed. During a period from the time t1 to the end of the period t4, the charged energy of the battery 105 does not exceed the discharged energy thereof. Therefore, the combustion power generation interruption determination (charged energy>discharged energy) is not established. The operating point of the internal combustion engine 101 falls within the combustion power generation execution operating region, and hence the combustion power generation is performed.

Subsequently, during a period t5, the vehicle is decelerated and thus the power regeneration is performed. Accordingly, the charged energy 422 of the battery 105 exceeds the discharged energy 421 thereof, and the combustion power generation interruption determination is established. That is, at a time point within the period t5, the amount of power consumption of the vehicle after the idling stop of the stop/start system is recovered by the power regeneration and the combustion power generation, and thus the combustion power generation interruption determination is established.

In this embodiment, when the combustion power generation interruption determination is once established after the idling stop of the stop/start system, the result of establishment may be held until the next idling stop of the stop/start system is executed. Alternatively, the determination may be set to be unestablished when the charged energy of the battery 105 is equal to or less than the discharged energy thereof after the first establishment is made. In this manner, until the charged energy of the battery 105 exceeds the discharged energy thereof again, the combustion power generation may be executed while the operating point of the internal combustion engine 101 falls within the combustion power generation execution operating region.

Note that, in this embodiment, there is described a mode in which the charged energy and the discharged energy of the battery 105 are calculated in a separated manner. However, the difference between the charged energy and the discharged energy of the battery 105 may be calculated for each control cycle, and the combustion power generation may be interrupted when the difference is equal to or less than a predetermined amount. Further, in this embodiment, there is described a mode in which no power supply is provided other than the battery 105 according to the present invention. However, it is needless to say that, when the battery 105 is charged by another power supply while the idling stop by the stop/start system is executed, and the charged energy of the battery 105 exceeds the discharged energy thereof, the combustion power generation interruption determination is established before the time t2, and the subsequent combustion power generation is not executed.

Note that, the charged energy, the discharged energy, and the difference therebetween are calculated by the charged and discharged amount calculating section 132 of the battery state calculating unit 130.

Further, in the above, the combustion power generation is interrupted when the charged energy exceeds the discharged energy, but the combustion power generation may be interrupted when the charged energy reaches the same amount as (becomes equal to) the discharged energy.

In the vehicle power generation device according to the second embodiment of the present invention described above, not only the operating region of the internal combustion engine for power generation but also the charged and discharged energy of the battery is considered. Thus, simultaneously with the recovery of the amount of power consumption of the vehicle after the idling stop of the stop/start system, the combustion power generation can be interrupted. After that, the internal combustion engine does not perform excessive power generation involving fuel consumption. Thus, the reduction of the regenerated energy due to the combustion power generation can be minimized, and the amount of fuel to be consumed for power generation can be reduced. Note that, in the vehicle power generation device according to the second embodiment of the present invention, the charged and discharged amount of the battery is represented by the unit of electric energy, but when this unit is electric charge, the same action as the vehicle power generation device in the first embodiment of the present invention can be achieved.

Third Embodiment

In the above-mentioned vehicle power generation device according to the second embodiment, the combustion power generation is interrupted when the charged energy of the battery after the idling stop of the stop/start system exceeds (or reaches the same amount as) the discharged energy thereof in the same period. In a vehicle power generation device according to a third embodiment of the present invention, on the other hand, the combustion power generation is interrupted when the charged energy of the battery after the idling stop of the stop/start system exceeds (or reaches the same amount as) the discharged energy of the battery after the idling stop of the stop/start system until the engine is restarted. That is, the combustion power generation is interrupted at a time point when the electric energy taken out from the battery while the idling stop of the stop/start system is executed is recovered by the power regeneration and the combustion power generation.

The schematic configuration diagram of the internal combustion engine having the vehicle power generation device mounted thereon according to the third embodiment is basically the same as FIG. 1. The timing chart illustrating the control operation of the power generation controller according to the third embodiment is basically the same as FIG. 4 in the second embodiment, but details of the control operation for interrupting the combustion power generation differ. The flowchart illustrating the combustion power generation execution processing of the power generation controller according to the third embodiment is basically the same as FIG. 3 in the first embodiment.

In the following, differences from the second embodiment are described with reference to the timing chart illustrating the control operation of the power generation controller according to the third embodiment illustrated in FIG. 5. In FIG. 5, parts (a) to (h) are the same as those in FIG. 2, and part (i) represents charged and discharged energy of the battery. In FIG. 5, a solid line 501 represents a vehicle speed, a solid line 502 represents a state of charge (SOC) of the battery, which corresponds to a residual capacity of the battery, a solid line 503 represents regenerated energy, a broken line 511 represents an SOC of the battery in a case where the present invention is not applied (related-art case where the combustion power generation is not interrupted), and a broken line 512 represents regenerated energy in a case where the present invention is not applied (reduction in battery charge acceptance at high SOC). Further, a chain line 531 represents an upper limit SOC at which the combustion power generation is interrupted when the SOC of the battery exceeds this value (combustion power generation execution upper limit SOC), a chain line 532 represents a lower limit SOC at which the combustion power generation is not interrupted when the SOC of the battery falls below this value (combustion power generation interruption lower limit SOC), and a broken line 541 represents excessive power generation that leads to increase in the amount of fuel consumption.

A dotted line 521 represents discharged energy of the battery 105 after the idling stop of the stop/start system is started until restart determination is established, and a solid line 522 represents charged energy of the battery 105 after the idling stop of the stop/start system is started. In this embodiment, the restart determination is established when the internal combustion engine 101 exceeds a predetermined number of revolutions (for example, 500 r/min) by restarting the internal combustion engine 101 at the same time when the idling stop of the stop/start system is cancelled.

At time t1, the idling stop of the stop/start system is started at a predetermined vehicle speed or less, and at the same time, the calculation of the discharged energy 521 and the charged energy 522 of the battery 105 is started. At time t2, the idling stop of the stop/start system is cancelled, and at the same time, the internal combustion engine 101 is restarted. When the restart determination is established, the calculation of the discharged energy of the battery 105 is stopped. When it is determined during a period t3 that the operating point of the internal combustion engine 101 falls within the combustion power generation execution operating region, the combustion power generation is performed to increase the charged energy of the battery 105. During a period t4, similarly to the period t3, the combustion power generation is performed. Thus, for example, the charged energy 522 of the battery 105 exceeds the discharged energy 521 until the restart determination is established, and the combustion power generation interruption determination (charged energy>discharged energy) is established.

That is, at a time point within the period t4, the electric energy taken out from the battery 105 while the idling stop of the stop/start system is executed (including the electric energy consumed by the internal combustion engine for restart) is recovered by the power regeneration and the combustion power generation, and thus the combustion power generation interruption determination is established. The SOC of the battery 105 after the combustion power generation is interrupted is lower than that in the case where the combustion power generation is not interrupted. However, the SOC of the battery 105 does not fall below the combustion power generation interruption lower limit SOC 532 before a period t5. During the period t5, the charge acceptance of the battery 105 is higher than that in the case where the combustion power generation is not interrupted, and hence the SOC of the battery 105 reaches the same SOC by performing the power regeneration. Note that, in this embodiment, there is described a mode in which the charged energy and the discharged energy of the battery 105 are calculated in a separated manner. However, the difference between the charged energy and the discharged energy of the battery 105 may be calculated for each control cycle, and the combustion power generation may be interrupted when the difference is equal to or less than a predetermined amount.

Note that, the charged energy, the discharged energy, and the difference therebetween are calculated by the charged and discharged amount calculating section 132 of the battery state calculating unit 130.

Further, in the above, the combustion power generation is interrupted when the charged energy exceeds the discharged energy, but the combustion power generation may be interrupted when the charged energy reaches the same amount as (becomes equal to) the discharged energy.

In the vehicle power generation device according to the third embodiment of the present invention described above, not only the operating region of the internal combustion engine for power generation but also the charged and discharged energy of the battery is considered. Thus, simultaneously with the recovery of the electric energy taken out from the battery while the idling stop of the stop/start system is executed, the combustion power generation can be interrupted. After that, the internal combustion engine does not perform excessive power generation involving fuel consumption. Thus, the reduction of the regenerated energy due to the combustion power generation can be minimized, and the amount of fuel to be consumed for power generation can be reduced. Note that, in the vehicle power generation device according to the third embodiment of the present invention, the charged and discharged amount of the battery is represented by the unit of electric energy, but the unit of electric charge or SOC may be used.

INDUSTRIAL APPLICABILITY

The vehicle power generation device according to the present invention is applicable to an internal combustion engine controller for various kinds of vehicle, and similar effects can be obtained.

REFERENCE SIGNS LIST

101 internal combustion engine, 102 power generator, 102*a*, 107, 108 current sensor, 103 power generation controller, 104 generated voltage adjuster, 104*a* generated voltage adjusting section, 105 battery, 106 electrical load, 109 power generation execution operating region determining section, 110 generated power setting section, 111 power generation interruption determining section, 112 generated current calculating section, 113 generated current control section, 120 power generation control unit, 130 battery state calculating unit, 131 SOC calculating section, 132 charged and discharged amount calculating section, 133 internal resistance value calculating section, DB drive belt, M memory section (memory), VC vehicle state information

The invention claimed is:

1. A power generation device for a vehicle configured to perform an idling stop at a predetermined vehicle speed or less by a stop/start system, the power generation device comprising:
    a power generator configured to be driven by an internal combustion engine to generate power;
    a battery to be charged by the power generated by the power generator; and
    a power generation controller to control power generation so as to reduce an amount of fuel to be consumed by the internal combustion engine for the power generation, the power generation controller comprising:
        a battery state calculating unit to obtain a state of the battery including at least one among a charged state and a discharged state; and
        a power generation control unit to control the internal combustion engine to charge the battery, in response to a vehicle restart request after the idling stop has been initiated, by:
    (a) performing the power generation during operating regions,
    (b) interrupting the power generation in the operating regions when the charged state of the battery has recovered to the charged state before a start of the idling stop, based on the state of the battery obtained by the battery state calculating unit, and
    (c) repeatedly performing (a) and (b) within the operating regions,
    wherein the operating regions are regions to perform the power generation involving fuel consumption in response to the vehicle restart request after the idling stop has been initiated.

2. The power generation device for a vehicle according to claim 1, further comprising a battery state detecting section to detect the state of the battery,
    wherein the battery state calculating unit calculates a state of charge (SOC) of the battery based on the state detected by the battery state detecting section, and
    wherein the power generation control unit determines that the charged state of the battery has recovered when the SOC of the battery reaches or exceeds an SOC of the battery at a time point when the idling stop is started through the charging after the idling stop.

3. The power generation device for a vehicle according to claim 1, further comprising a current detecting section to detect charged and discharged currents of the battery,
wherein the battery state calculating unit calculates a discharged amount and a charged amount of the battery after the idling stop based on the charged and discharged currents of the battery, and
wherein the power generation control unit determines that the charged state of the battery has recovered when the charged amount of the battery reaches the same amount as or exceeds the discharged amount of the battery through the charging after the idling stop.

4. The power generation device for a vehicle according to claim 1, further comprising a current detecting section to detect charged and discharged currents of the battery,
wherein the battery state calculating unit calculates a difference between a charged amount and a discharged amount of the battery after the idling stop based on the charged and discharged currents of the battery, and
wherein the power generation control unit determines that the charged state of the battery has recovered when the difference becomes equal to or less than a predetermined amount through the charging after the idling stop.

5. The power generation device for a vehicle according to claim 1, further comprising a current detecting section to detect charged and discharged currents of the battery,
wherein the battery state calculating unit calculates a discharged amount of the battery after the idling stop until the internal combustion engine is restarted and a charged amount of the battery after the idling stop based on the charged and discharged currents of the battery, and
wherein the power generation control unit determines that the charged state of the battery has recovered when the charged amount of the battery reaches the same amount as or exceeds the discharged amount of the battery through the charging after the idling stop.

6. The power generation device for a vehicle according to claim 1, further comprising a current detecting section to detect charged and discharged currents of the battery,
wherein the battery state calculating unit calculates a difference between a discharged amount of the battery after the idling stop until the internal combustion engine is restarted and a charged amount of the battery after the idling stop based on the charged and discharged currents of the battery, and
wherein the power generation control unit determines that the charged state of the battery has recovered when the difference becomes equal to or less than a predetermined amount through the charging after the idling stop.

7. The power generation device for a vehicle according to claim 1,
wherein the battery state calculating unit calculates a state of charge (SOC) of the battery, and
wherein the power generation control unit controls the internal combustion engine to interrupt the power generation involving the fuel consumption when the SOC of the battery exceeds a predetermined upper limit value.

8. The power generation device for a vehicle according to claim 1,
wherein the battery state calculating unit calculates a state of charge (SOC) of the battery, and
wherein the power generation control unit controls the internal combustion engine to avoid interrupting the power generation involving the fuel consumption when the SOC of the battery falls below a predetermined lower limit value.

9. The power generation device for a vehicle according to claim 1,
wherein the battery state calculating unit calculates an internal resistance value of the battery, and
wherein the power generation control unit controls the internal combustion engine to avoid interrupting the power generation involving the fuel consumption when the internal resistance value of the battery is outside a predetermined range.

10. The power generation device for a vehicle according to claim 2,
wherein the power generation control unit controls the internal combustion engine to interrupt the power generation involving the fuel consumption when the SOC of the battery exceeds a predetermined upper limit value.

11. The power generation device for a vehicle according to claim 3,
wherein the battery state calculating unit calculates a state of charge (SOC) of the battery, and
wherein the power generation control unit controls the internal combustion engine to interrupt the power generation involving the fuel consumption when the SOC of the battery exceeds a predetermined upper limit value.

12. The power generation device for a vehicle according to claim 5,
wherein the battery state calculating unit calculates a state of charge (SOC) of the battery, and
wherein the power generation control unit controls the internal combustion engine to interrupt the power generation involving the fuel consumption when the SOC of the battery exceeds a predetermined upper limit value.

13. The power generation device for a vehicle according to claim 2,
wherein the power generation control unit controls the internal combustion engine to avoid interrupting the power generation involving the fuel consumption when the SOC of the battery falls below a predetermined lower limit value.

14. The power generation device for a vehicle according to claim 3,
wherein the battery state calculating unit calculates a state of charge (SOC) of the battery, and
wherein the power generation control unit controls the internal combustion engine to avoid interrupting the power generation involving the fuel consumption when the SOC of the battery falls below a predetermined lower limit value.

15. The power generation device for a vehicle according to claim 5,
wherein the battery state calculating unit calculates a state of charge (SOC) of the battery, and
wherein the power generation control unit controls the internal combustion engine to avoid interrupting the power generation involving the fuel consumption when the SOC of the battery falls below a predetermined lower limit value.

16. The power generation device for a vehicle according to claim 2, wherein the battery state calculating unit calculates an internal resistance value of the battery, and wherein the power generation control unit controls the internal combustion engine to avoid interrupting the power generation involving the fuel consumption when the internal resistance value of the battery is outside a predetermined range.

17. The power generation device for a vehicle according to claim 3, wherein the battery state calculating unit calculates an internal resistance value of the battery, and wherein the power generation control unit controls the internal combustion engine to avoid interrupting the power generation involving the fuel consumption when the internal resistance value of the battery is outside a predetermined range.

18. The power generation device for a vehicle according to claim 5, wherein the battery state calculating unit calculates an internal resistance value of the battery, and wherein the power generation control unit controls the internal combustion engine to avoid interrupting the power generation involving the fuel consumption when the internal resistance value of the battery is outside a predetermined range.

19. A power generation control method for a vehicle configured to perform an idling stop at a predetermined vehicle speed or less by a stop/start system, the vehicle including a power generator configured to be driven by an internal combustion engine to generate power, and a battery to be charged by the power generated by the power generator, the power being generated in the vehicle so as to reduce an amount of fuel to be consumed by the internal combustion engine for power generation, the power generation control method comprising:

detecting at least one among a charged state and a discharged state of the battery; and controlling the internal combustion engine to charge the battery, in response to a vehicle restart request after the idling stop has been initiated, by:

(a) performing the power generation during operating regions, (b) interrupting the power generation in the operating regions when the charged state of the battery has recovered to the charged state before a start of the idling stop, based on the detecting, and (c) repeatedly performing (a) and (b) within the operating regions, wherein the operating regions are regions to perform the power generation involving fuel consumption in response to the vehicle restart request after the idling stop has been initiated.

* * * * *